United States Patent

Suzuki et al.

[11] Patent Number: 5,973,427
[45] Date of Patent: Oct. 26, 1999

[54] COOLING DEVICE FOR ELECTRIC MOTOR

[75] Inventors: Satomi Suzuki; Masafumi Sakuma, both of Aichi Pref., Japan

[73] Assignee: Aisin Seiki Kabushiki Kaisha, Kariya, Japan

[21] Appl. No.: 09/050,076

[22] Filed: Mar. 30, 1998

[30] Foreign Application Priority Data

Mar. 28, 1997 [JP] Japan ........................................ 9-78046
Aug. 29, 1997 [JP] Japan ...................................... 9-233571

[51] Int. Cl.[6] ........................................................ H02K 3/24
[52] U.S. Cl. .................................. 310/54; 310/52; 310/64
[58] Field of Search ................................. 310/64, 52, 54, 310/58

[56] References Cited

U.S. PATENT DOCUMENTS 2,695,368  11/1954  Kilbourne ................................... 310/64
2,897,382   7/1959  Hamill ........................................ 310/64
5,489,810   2/1996  Ferreira et al. ............................ 310/54

OTHER PUBLICATIONS

The Transactions of The Institute of Electrical Engineers of Japan (T.IEEE Japan), vol. 116–D, No. 11, 1996 (Figure 4, p. 1096).

*Primary Examiner*—Thomas M. Dougherty
*Assistant Examiner*—B. Mullins
*Attorney, Agent, or Firm*—Sughrue, Mion, Zinn, Macpeak & Seas, PLLC

[57] ABSTRACT

A cooling device for an electric motor includes a plurality of inwardly projected stator poles arranged in a circumferential direction such that an axially extending space is defined between two adjacent stator poles. Coils are wound on the respective stator poles and coolers are disposed in the respective spaces such that each of the coolers is in thermal contact with its neighboring coils.

3 Claims, 9 Drawing Sheets

COOLING DEVICE FOR ELECTRIC MOTOR

BACKGROUND OF THE INVENTION

The present invention relates to a cooling device for an electric motor such as a switched reluctance motor in which a coil is wound on each of a plurality of projected poles of a stator.

In general, there are four types of cooling devices for electric motors as follows:

(a) Free cooling device: constructed such that a plurality of fins are provided on the outside of a housing of an electric motor.

(b) Compulsive cooling device: constructed such that a fan is provided inside or outside a housing of an electric motor so as to exhaust high temperature air outside the electric motor housing.

(c) Water cooling device: constructed within a housing of an electric motor.

(d) Oil spray cooling device: constructed such that an amount of oil is sprayed from an output shaft of an electric motor for cooling the same.

However, the foregoing four devices are not satisfactory at all. In detail, the fins are not expected to be practical especially when no winds blow or a heat generation source is isolated from the fins. The compulsive cooling device is widely used but its cooling ability is not very good. The reason is that the electric motor has to be located in a sealed construction when it is placed under wet or humid conditions and therefore, the generated heat in the sealed motor housing has no passages to escape outside. In addition, the water cooling device is often spaced from a heat generation source so that the cooling ability is inefficient. Furthermore, to form water passages in the housing of the electric motor, the thickness of the housing becomes inevitably thick and therefore the total weight of the motor and castings for forming the housing are very large, expensive and complex. In the oil spray cooling device, foreign matter or particles are generated due to oil deterioration and the resultant foreign matter or particles may clog or plug an oil passage. Thus, it is difficult to achieve satisfactory cooling using the oil spray cooling device.

SUMMARY OF THE INVENTION

It is therefore one of the objects of the present invention to provide a cooling device for an electric motor without the foregoing drawbacks.

It is another object to provide a cooling device for an electric motor by which satisfactory cooling can be achieved.

In order to attain the foregoing objects, a cooling device for an electric motor in accordance with the present invention includes a plurality of inwardly projected stator poles arranged in a circumferential direction such that an axially extending space is defined between two adjacent stator poles, coils wound on the respective stator poles, and coolers disposed in the respective spaces such that each of the coolers is set to be in thermal contact with both neighboring coils.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings.

DETAILED DESCRIPTION OF THE INVENTION

Preferred embodiments of the present invention will be described hereinafter in detail with reference to the accompanying drawings.

Referring first to FIGS. 1–7 inclusive, there is depicted a switched reluctance motor 10 to which a first embodiment of a cooling device according to the present invention is applied.

The switched reluctance motor 10 includes a cylindrical housing 11 which is formed of an aluminum alloy or other suitable metal. The housing 11 is provided at its opposite ends with brackets 11c and 11d which are connected to the housing 11 respectively as can be seen from FIG. 2. Along the full length of the inner periphery 11a of the housing 11, a stator 12 is fixedly mounted. The stator 12 is formed such that a plurality of thin annular electromagnetic steel plates are stacked in contact with one another and the resultant layered structure is fixed at its outer periphery to the inner periphery 11a of the housing 11 via a holding member lie by means of shrink fitting.

The stator 12 includes six pairs of pole portions or projected poles (13a, 13b), (14a, 14b), (16a, 16b), (17a, 17b), (18a, 18b) and (19a, 19b). The projected poles 13a, 14a, 16a, 17a, 18a, 19a, 13b, 14b, 16b, 17b, 18b and 19b are arranged in this order in the counter-clockwise direction in FIG. 1 in such a manner that the projected poles 13a, 14a, 16a, 17a, 18a and 19a are in radial opposition to the projected poles 13b, 14b, 16b, 17b, 18b and 19b, respectively. Each of the projected poles extends in parallel to an axis of the housing 11 and is therefore formed into an axially elongated projection which projects inwardly.

Figure 2:
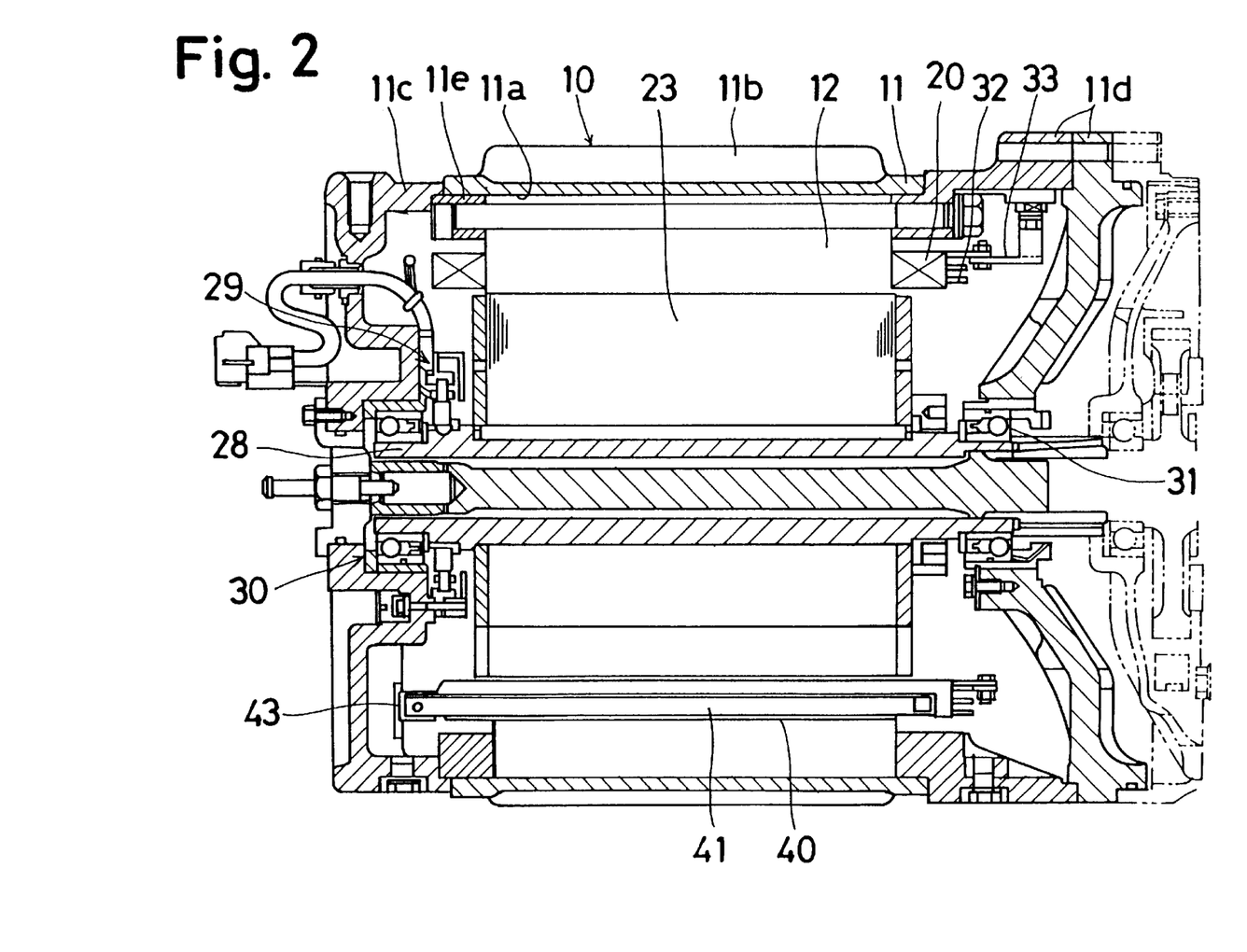
FIG. 2 is a vertical cross-sectional view of the switched reluctance motor shown in FIG. 1.
Figure 6:
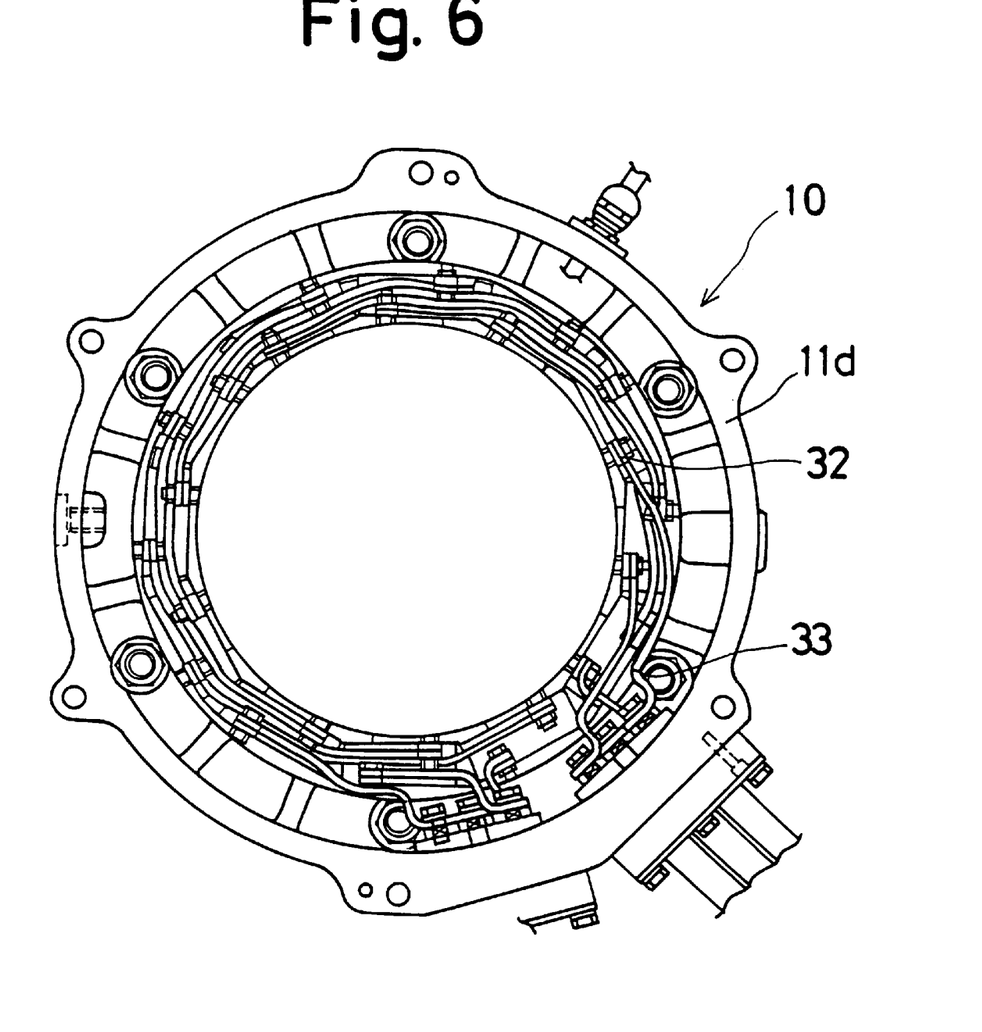
FIG. 6 is a side view of the switched reluctance motor from which another bracket is removed.
Figure 7:
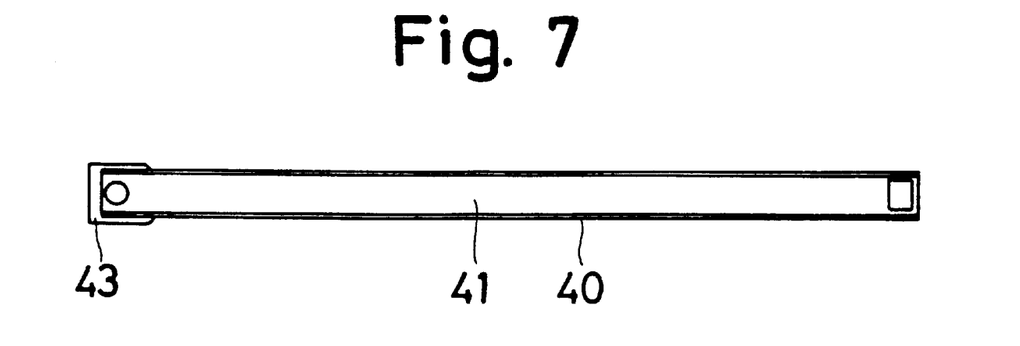
FIG. 7 is a vertical cross-sectional view of the cooling device shown in FIG. 4.
Figure 8:
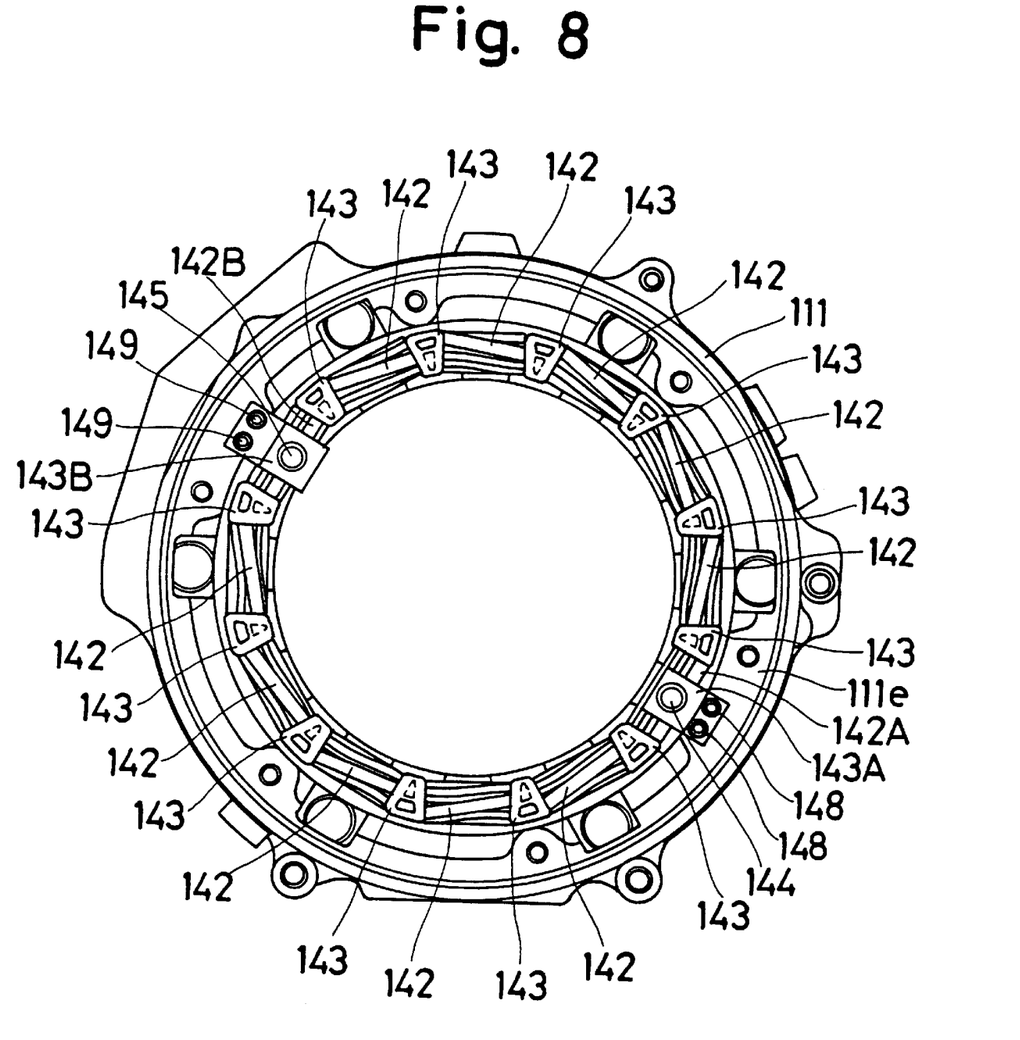
FIG. 8 is a side view of another switched reluctance motor.
Figure 9:
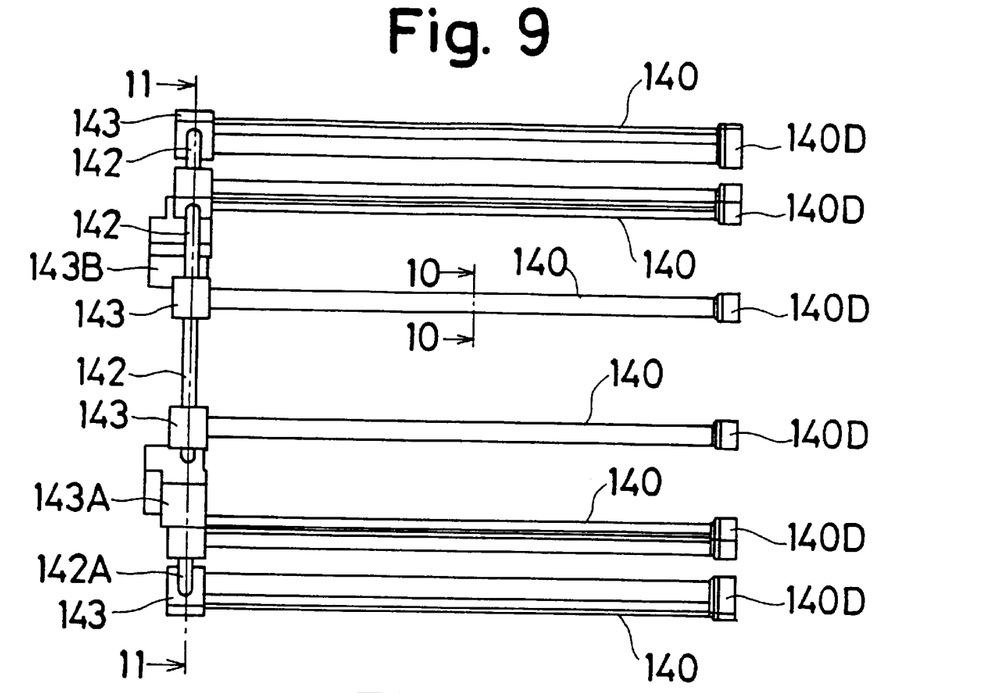
FIG. 9 is a side view of a second embodiment of a cooling device in accordance with the present invention.
Figure 10:
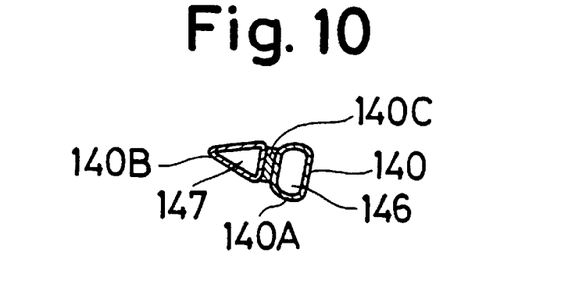
FIG. 10 is a cross-sectional view taken along line 10—10 in FIG. 9.
Figure 11:
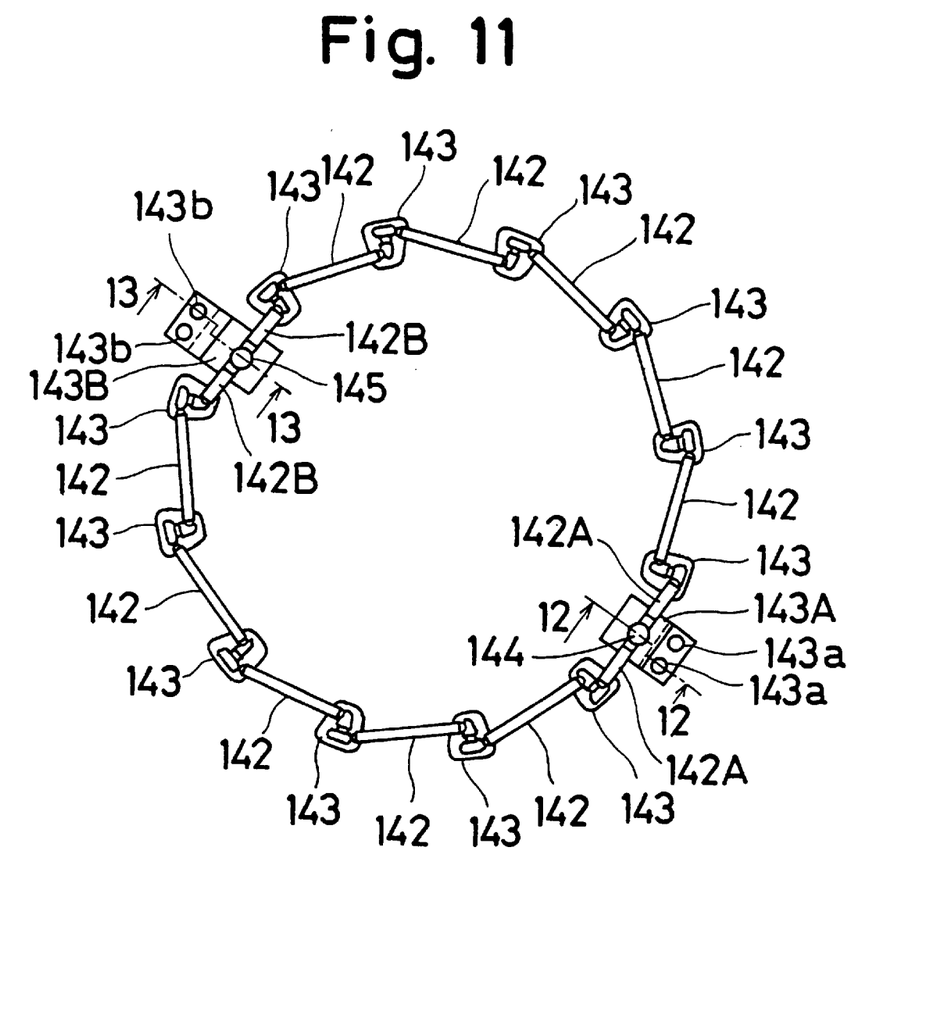
FIG. 11 is a cross-sectional view taken along line 11—11 in FIG. 9.
Figure 12:
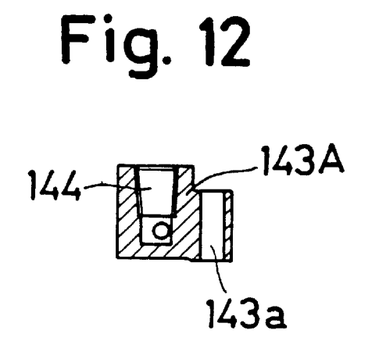
FIG. 12 is a cross-sectional view taken along line 12—12 in FIG. 11.
Figure 13:
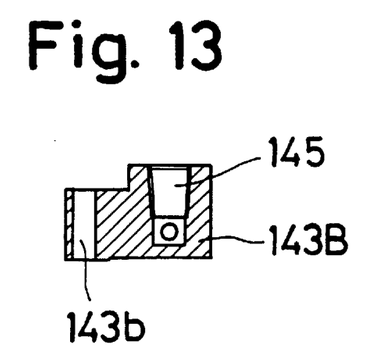
FIG. 13 is a cross-sectional view taken along line 13—13 in FIG. 11.
Figure 14:
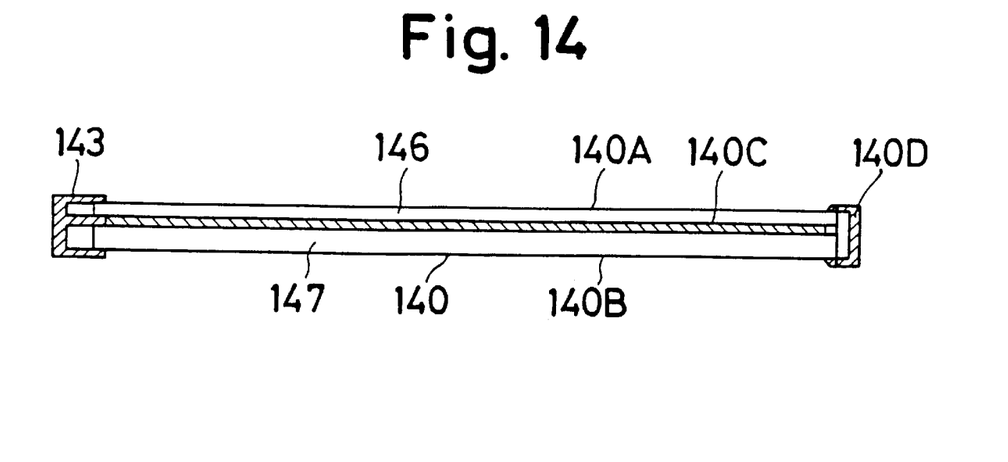
FIG. 14 is an enlarged vertical sectional view of the cooling device shown in FIG. 9.

Four independent coils 20 are wound on the poles 13a, 13b, 17a and 17b, respectively. These coils 20 are connected in series. Four independent coils 21, which are connected in series, are wound on the poles 14a, 14b, 18a and 18b, respectively. Independent coils 22, which are connected in series, are wound on the poles 16a, 16b, 19a and 19b, respectively. The four coils 20, the four coils 21 and the four coils 22 are connected to a driving circuit (not shown). As best seen in FIGS. 2 and 6, one end of the coil 20 is connected to a terminal 32 to which one end of another coil 20 is connected while the other end of the coil 20 is connected to a terminal 33 which leads the same to the driving circuit.

A rotor 23, which has a central bore at its central portion, is formed of multiple layers of thin electromagnetic plates. As can be seen from FIG. 2, an output shaft 28 is fitted in the central bore of the rotor 23 and a key (not shown) is disposed therebetween so as to establish unitary rotation. One end portion of the shaft 28 is rotatably supported on the bracket 11c via a bearing 30 while the other end is rotatably supported on the bracket 11d via a bearing 31. Thus the rotor 23 is set to be rotatable within the stator 12 together with the output shaft 28.

Eight equally spaced poles 24a, 24b, 25a, 25b, 26a, 26b, 27a and 27b are formed on the rotor 23 so as to be projected outwardly and are arranged in the circumferential direction. When each of the poles 24a, 24b, 25a, 25b, 26a, 26b, 27a and 27b is brought into alignment with one of the projected poles 13a, 14a, 16a, 17a, 18a, 19a, 13b, 14b, 16b, 17b, 18b and 19b depending on the angular position of the rotor 23, a gap or clearance is defined between two opposed poles.

Figure 1:
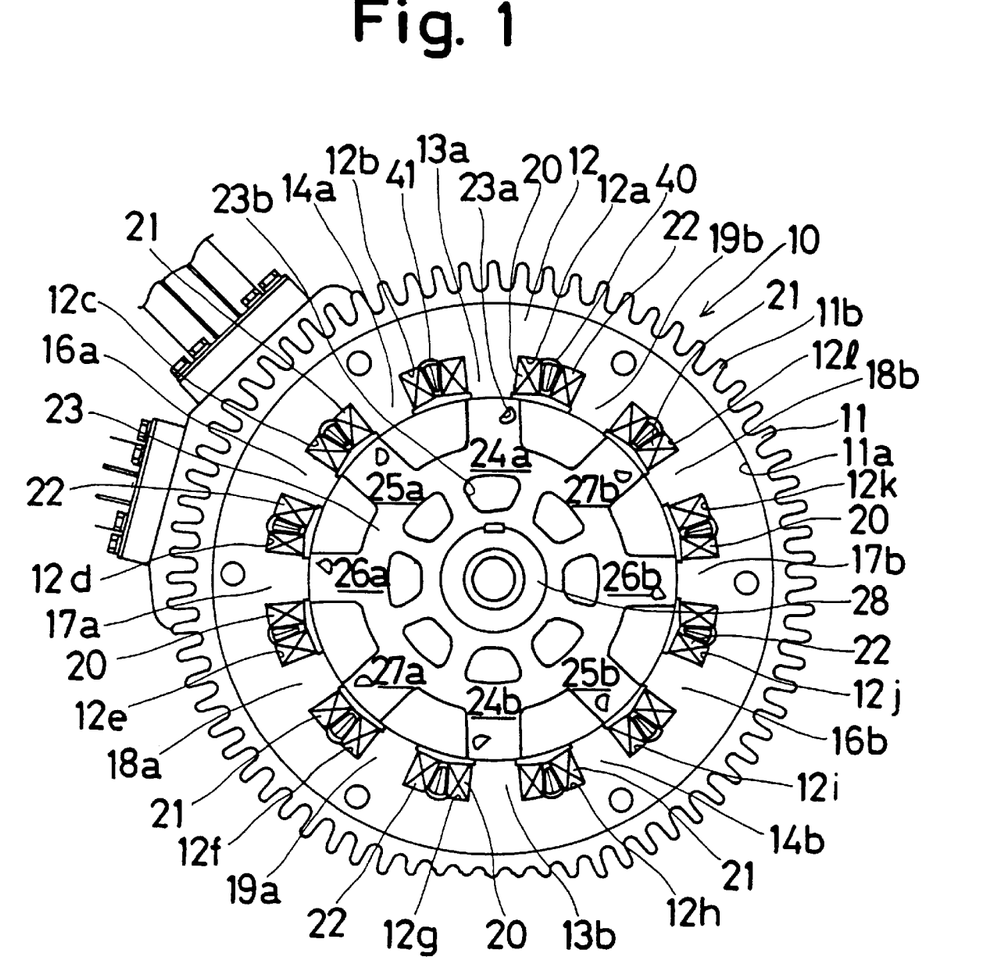
FIG. 1 shows a transverse cross-sectional view of a first embodiment of a switched reluctance motor to which a first embodiment of the present invention is applied.

As shown in FIG. 1, around the central bore of the rotor 23, there are provided axially extending holes 23b, which are in radial alignment with the poles 24a, 24b, 25a, 25b, 26a, 26b, 27a and 27b, respectively. The holes 23b serve for decreasing the radial rigidity or stiffness of the corresponding poles in order to absorb any shocks upon attraction thereof. Thus, shock is prevented from being transmitted to the output shaft 28.

The rotor 23 is expected to be rotated in the counterclockwise direction in FIG. 1 and, at the clockwise side of each of the poles 24a, 24b, 25a, 25b, 26a, 26b, 27a and 27b which is near the corresponding projection pole, there is formed a hole 23a which extends in the axial direction. These holes 23a serve for preventing rapid decrease of magnetic attractive forces when the current supply to each of the coils 20, 21 and 23 is terminated or interrupted, thereby decreasing vibrations and the resulting noises.

At one end portion of the output shaft 28, there is provided a rotational sensor 29 which is in the form of a well-known encoder or resolver to detect the rotation or angular movement of the rotor 23. The sensor 29 is electrically connected to a controller (not shown) to feed signals indicating angular positions of the rotor 23.

The controller is connected to the driving circuit to which the coils 20, 21, 22 are connected so as to control the same in response to the current angular position of the rotor 23. The driving circuit is in the form of an inverting circuit which includes switching elements such as transistors or thyristors and is expected to issue current pulses to the coils 20, 21 and 22 based on the output signal from the controller which depends on the angular position of the rotor 23.

As can be seen from FIGS. 1 and 2, in an axially extending spaced defined between two adjacent coils, there is provided or disposed a cooling pipe or conduit 40 formed of a metal having a high or excellent thermal conductivity such as copper. The total number of pipes 40 is twelve. Each of the pipes 40 is in thermal contact with its neighboring coils and after completion of the insertion of the pipes 40 in the respective spaces between coils, the remaining space between the coils is filled with a synthetic resin having a high thermal conductivity.

As apparent from FIGS. 1, 2, 4 and 7, the inner space of each of the pipes 40 is divided into a pair of side-by-side positioned passages 46 and 47 by a partition wall 41 which extends the full axial length of the pipe 40. The passage 46 (47) has one end and the other end at a side of the bracket 11c and the bracket 11d, respectively. The passages 46 and 47 are isolated from each other except that the other end of both passages 46 and 47 are in fluid communication with each other. Thus, as a whole, the passages 46 and 47 constitute a hairpin shaped configuration.

Figure 3:
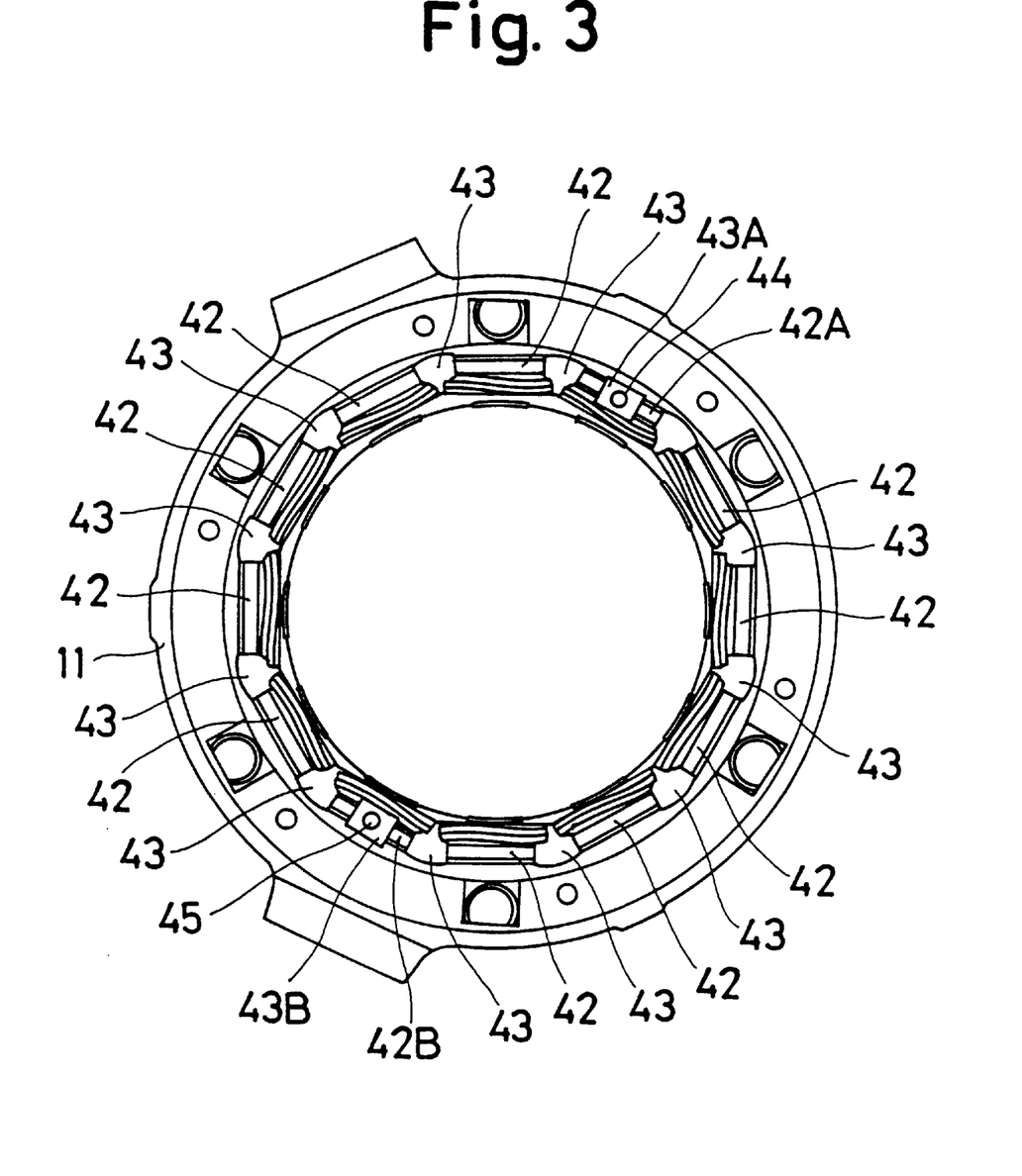
FIG. 3 is a side view of the switched reluctance motor shown in FIG. 1 from which a bracket is removed.
Figure 4:
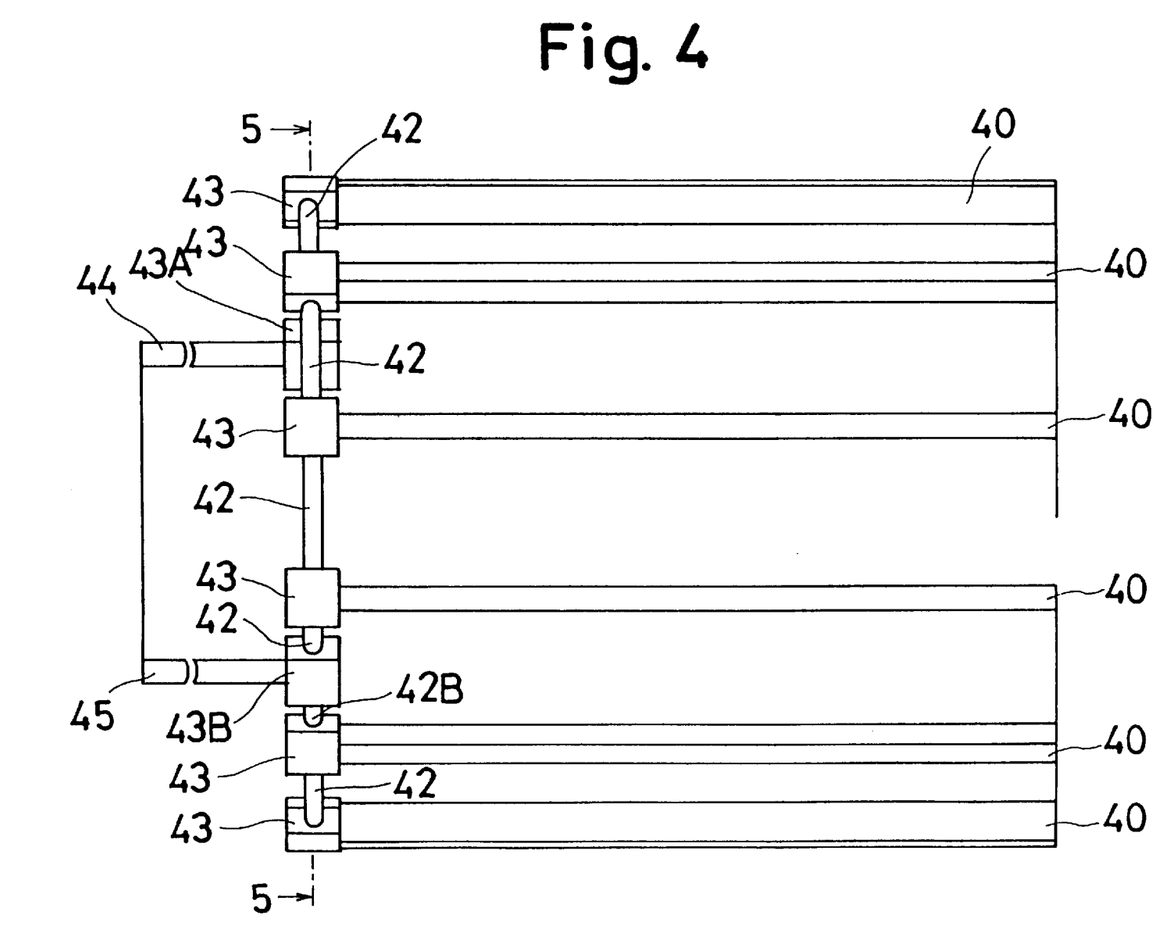
FIG. 4 shows a first embodiment of a cooling device in accordance with the present invention.
Figure 5:
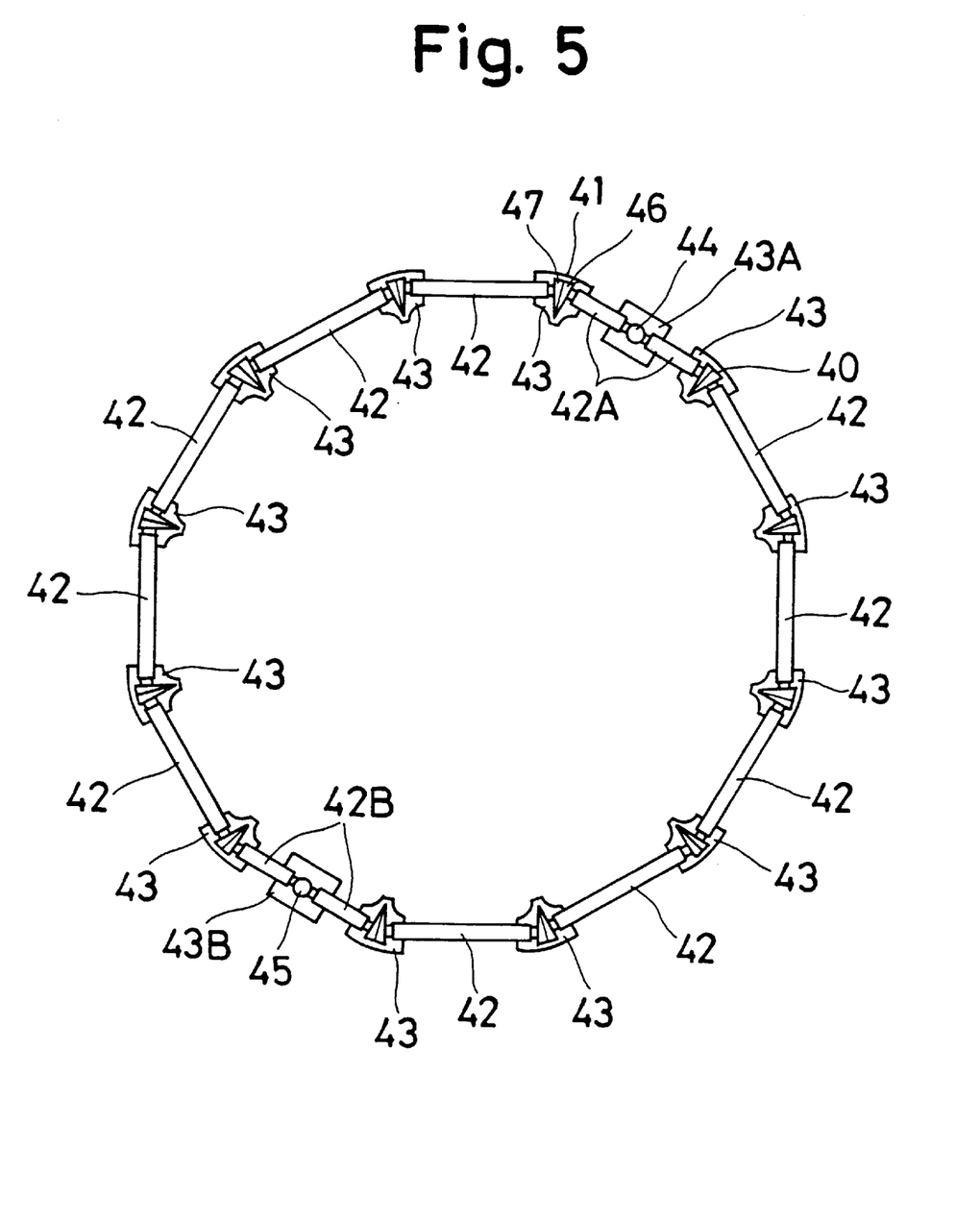
FIG. 5 is a cross-sectional view taken along line 5-5 in FIG. 4.

As shown in FIGS. 3 through 5, one end of a pipe 40 and one end of an adjacent pipe 40 are connected to each other by a connecting pipe 42 in order to establish a fluid communication therebetween. For keeping a firm relationship between the connecting pipe 42 and one end of the pipe 40, a reinforcing member 43 is provided. A pair of radially opposed connecting members 43A and 43B are provided. The connecting member 43A has an inlet port 44 through which cooling water is supplied. The inlet port 44 is connected to a pair of connecting pipes 42A and 42A, each of which is connected to the first passage 46 of the cooling pipe 40 next to the connecting member 43A. The connecting member 43B has an outlet port 45 to which is connected a pair of connecting pipes 42B and 42B, each of which is connected to the second passage 47 of the cooling pipe 40 next to the connecting member 43B. Thus, the outlet port 45 serves for draining the cooling water after passing through the plural sets of the first passage 46 and the second passage 47.

It is to be noted that the foregoing connecting pipes 42, 42A and 42B and the connecting members 43, 43A and 43B, are located at the side adjacent the bracket 11c, whereby these members do not interfere with the terminals 32 and 33 and other elements adjacent the bracket 11d.

In the electric motor 10 having the aforementioned structure, when the sensor 29 detects an angular position of rotor 23 at which two pairs of the poles of the rotor 23 are in radial alignment with two corresponding pairs of the poles of the stator 11, the controller begins to feed a signal depending on the detected condition to the driving circuit. In detail, assuming that FIG. 1 shows a condition when the motor 10 is at rest, under such a situation, if the driving circuit supplies a current to the coils 22 and 22 wound on the stator poles 16a and 16b, respectively, the pair of radially opposed stator poles 16a and 16b are magnetized, whereby the rotor poles 25a and 25b are rotated in the counter-clockwise direction by being attracted by the stator poles 16a and 16b, respectively. As soon as the stator poles 16a and 16b are brought into radial alignment with the stator poles 25a and 25b, respectively, the coils 22 are turned off.

Simultaneous to the turning-off of the coils 22, the coils 21 are turned on, thereby magnetizing the stator poles 14a and 14b. The resulting stator poles 14a and 14b attract the rotor poles 24a and 24b, respectively, which results in a counter-clockwise rotation of the rotor 23. Immediately when the rotor poles 24a and 24b come to be in radial alignment with the stator poles 14a and 14b, respectively, the coils 22 are turned off and a simultaneous current application is established to each of the coils 20. Thereafter, repeating current supply in such a manner that upon completion of the current supply to a specific pair of radially opposed stator poles, the current supply is established to another pair of radially opposed stator poles to provide a continual rotation of the rotor 23 until all the coils 20, 21, 22 and 23 are turned off.

Each of the coils 20 is heated up to high temperatures due to application of the pulse current. The coils 21, 22 and 23 are also heated in the same manner but the cooling is only explained with respect to coils 20 for simplicity in explanation. The resultant heat produced by each of the coils 20 is dissipated by the cooling water which runs through the first passage 46 and the second passage 47 in the cooling pipe 40 adjacent to the coil 20. In detail, in FIG. 5, the cooling water supplied to the inlet port 44 of the connecting member 43A is fed through pipe 42A to the first passage 46 of the pipe 40 located close to the left side of the connecting member 43A. The cooling water then travels the length of the passage 46 and flows into the second passage 47 whereby it travels the length of the passage 47. The just returned cooling water is then supplied to the first passage 46 of the next or adjacent pipe 40 after passing through the connecting pipe 42. Thereafter, after repeating the foregoing flow movements in the plural pipes 40, the cooling water is heated and then drained from the outlet port 45 of the connecting member 43B.

Referring to FIGS. 8-14 inclusive, in this embodiment, a total of twelve cooling pipes 140 are provided which correspond to the cooling pipes 40 of the first embodiment. Each cooling pipe 140 includes a first tube 140A and a second tube 140B which correspond to the first passage 46 and the second passage 47 of the cooling pipe 40, respectively, in the first embodiment. However, in the second embodiment, the first tube 140A and the second tube 140B are juxtaposed in the radial direction and a heat transfer member 140C is interposed therebetween. One end of the first tube 140A and one end of the second tube 140B are connected to each other by a connecting member 140D for establishing fluid communication therebetween. The heat transfer member 140C serves for increasing heat radiation ability as well as the stiffness or rigidity of the cooling pipe 140.

At the other end of the cooling pipe 140, the first tube 140A is connected to a second tube 140B of the neighboring cooling pipe 140. Such a connection is reinforced by a connecting member 143. A pair of diametrically opposed connecting members 143A and 143B are provided. The connecting member 143A has an inlet port 144 to which cooling water is supplied. The inlet port 144 is connected to a pair of connecting pipes 142A and 142A, each of which is connected to the first tube 140A on opposite sides of the connecting member 143A. The connecting member 143B has an outlet port 145 to which is connected a pair of connecting pipes 142B and 142B, each of which is connected to the second tube 140B on opposite sides of the connecting member 143B. Thus the outlet port 145 serves for draining the cooling water from the system after passing through the plural sets of first tubes 140A and second tubes 140B. The connecting members 143A and 143B are secured to a holding member 111e by bolts 148 and 149, respectively, which, in turn, is fixed to the housing 111.

In the structure of the second embodiment, the first passage 146 and the second passage 147 as defined in the first pipe 140A and the second pipe 140B, respectively, are independent of each other. Thus, the cooling ability will not be damaged or lowered by poor or insufficient thermal separation of one passage from the other passage. In addition, the connecting members 143A and 143B, which have the inlet port 144 and the outlet port 145, respectively, are secured or fixedly mounted to the housing 111 via the holding member 111e fixed thereto, which lessens any damage of the cooling pipes 140 due to vibrations transmitted thereto.

The invention has thus been shown and described with reference to preferred embodiments thereof, it will be understood by those in the art that the foregoing and other changes in form and details may be made therein without departing from the spirit and scope of the invention.

What is claimed is:

1. A cooling device for an electric motor comprising:

a cylindrical stator having a first axial end, a second axial end and a plurality of inwardly projected stator poles which are arranged in a circumferential direction such that an axially extending space is defined between two adjacent stator poles;

coils wound on the respective stator poles;

a terminal connected to the coils and disposed at the first axial end of the cylindrical stator;

a plurality of pairs of cooling pipes, each pair of cooling pipes for passing a cooling fluid being disposed in respective spaces in thermal contact with adjacent coils, and each pair of cooling pipes having a fluid supplying pipe and a fluid discharging pipe;

a plurality of connecting members each of which connects between the fluid supplying pipe and the fluid discharging pipe, and which is disposed near the first axial end of the cylindrical stator;

a plurality of connecting pipes each of which connects between the adjacent pair of cooling pipes and is disposed at the second axial end of the cylindrical stator.

2. A cooling device as set forth in claim 1, wherein the cooling fluid is water.

3. A cooling device as set forth in claim 1, wherein a synthetic resin of high thermal conductivity is filled in a gap formed between each of the neighboring coils and a portion of each cooling means which is out of thermal contact with the coils.

\* \* \* \* \*